(12) United States Patent
Goel et al.

(10) Patent No.: US 11,486,599 B2
(45) Date of Patent: Nov. 1, 2022

(54) HVAC SYSTEM OPERATED WITH ADAPTIVE DISCHARGE AIR TEMPERATURE SETPOINT

(71) Applicant: Lennox Industries Inc., Richardson, TX (US)

(72) Inventors: Rakesh Goel, Irving, TX (US); Juan Antonio Contreras Lafaire, Frisco, TX (US)

(73) Assignee: Lennox Industries Inc., Richardson, TX (US)

( * ) Notice: Subject to any disclaimer, the term of this patent is extended or adjusted under 35 U.S.C. 154(b) by 67 days.

(21) Appl. No.: 17/203,528

(22) Filed: Mar. 16, 2021

(65) Prior Publication Data

US 2022/0299235 A1 Sep. 22, 2022

(51) Int. Cl.
 *F24F 11/86* (2018.01)
(52) U.S. Cl.
 CPC .................................. *F24F 11/86* (2018.01)
(58) Field of Classification Search
 CPC ..... F24F 11/86; F24F 2110/10; F25B 49/022; F25B 2600/025; F25B 2600/0253; F25B 2700/21173
 See application file for complete search history.

(56) References Cited

U.S. PATENT DOCUMENTS

| 11,092,151 B2 * | 8/2021 | Zhou | F04B 27/14 |
| 2017/0211833 A1 * | 7/2017 | Tran | F25B 49/022 |
| 2022/0186996 A1 * | 6/2022 | Goel | F24F 3/14 |

* cited by examiner

*Primary Examiner* — Marc E Norman
(74) *Attorney, Agent, or Firm* — Baker Botts L.L.P.

(57) ABSTRACT

An HVAC system includes a blower, a variable-speed compressor, an indoor air temperature sensor that measures an indoor air temperature (IAT) of an enclosed space, a discharge air temperature sensor that measures a discharge air temperature (DAT) of the flow of air from an evaporator, and a controller. The controller stores an indoor temperature setpoint and a default discharge air temperature setpoint. The controller receives the IAT and the DAT. The controller determines that the IAT is not within a threshold range of the indoor temperature setpoint. The controller then determines an adaptive discharge air temperature setpoint. The controller determines a compressor speed at which to operate the variable-speed compressor based on the adaptive discharge air temperature setpoint. The controller causes the variable-speed compressor to operate at the determined compressor speed.

20 Claims, 5 Drawing Sheets

HVAC SYSTEM OPERATED WITH ADAPTIVE DISCHARGE AIR TEMPERATURE SETPOINT

TECHNICAL FIELD

The present disclosure relates generally to heating, ventilation, and air conditioning (HVAC) systems and methods of their use. In certain embodiments, the present disclosure relates to an HVAC system operated with adaptive discharge air temperature setpoint.

BACKGROUND

Heating, ventilation, and air conditioning (HVAC) systems are used to regulate environmental conditions within an enclosed space. In a cooling mode operation of the HVAC system, a flow of air may be cooled via heat transfer with refrigerant and returned to the enclosed space as cooled conditioned air.

SUMMARY OF THE DISCLOSURE

Previous HVAC systems may fail to reach target or setpoint air temperatures, even when the system has unused cooling capacity (e.g., when additional compressor capacity is available). Previous HVAC systems may also or alternatively be slow to provide cooling when there is a sudden change in load, such as when the system switches from an idle state to a cooling state or when the setpoint temperature is decreased. HVAC systems which operate a blower in a control loop based on indoor temperature and compressor(s) in a separate control loop based on discharge air temperature may be particularly prone to the problems described above. Indoor air temperature refers to a temperature of air in an enclosed space into which conditioned air is provided, and discharge air temperature refers to a temperature of air downstream of an evaporator of the HVAC system. Using previous technology, a target indoor temperature may be reached only very slowly or may never be reached.

This disclosure solves problems of previous technology, including those described above, using an adaptive discharge air temperature setpoint. When a controller of the HVAC system determines that an indoor temperature setpoint is not being reached, an adaptive discharge air temperature is determined. Compressor(s) of the HVAC system are then operated based on this adaptive setpoint to provide improved cooling. The adaptive discharge air temperature setpoint may be used at least until the indoor setpoint temperature is reached. The systems and methods described in this disclosure may be integrated into a practical application of an adaptive HVAC controller that provides faster and more reliable indoor air temperature control for HVAC systems operating separate control mechanisms for a blower based on indoor air temperature and compressor(s) based on discharge air temperature. The HVAC system of this disclosure may operate at an increased cooling capacity when needed in order to reach comfortable indoor temperature more rapidly. The use of an adaptive discharge air temperature setpoint by the HVAC system controller ensures that an indoor setpoint is reached under conditions in which previous systems may fail to provide adequate cooling to the space. Certain embodiments may include none, some, or all of the above technical advantages. One or more other technical advantages may be readily apparent to one skilled in the art from the figures, descriptions, and claims included herein.

In an embodiment, a heating, ventilation and air conditioning (HVAC) system includes a blower configured to provide a flow of air across an evaporator of the HVAC system, a variable-speed compressor configured to compress a refrigerant flowing through the HVAC system, an indoor air temperature sensor positioned and configured to measure an indoor air temperature (IAT) of the enclosed space, a discharge air temperature sensor positioned and configured to measure a discharge air temperature (DAT) of the flow of air downstream of the evaporator, and a controller. A memory of the controller stores an indoor temperature setpoint and a default discharge air temperature setpoint. The controller receives the IAT and the DAT. The controller determines, based on a difference between the received IAT and the indoor temperature setpoint, that the IAT is not within a threshold range of the indoor temperature setpoint. After determining that the IAT is not within the threshold range of the indoor temperature setpoint, the controller determines an adaptive discharge air temperature setpoint based on the default discharge air temperature setpoint and the difference between the received IAT and the indoor temperature setpoint. The controller determines a compressor speed at which to operate the variable-speed compressor based on the adaptive discharge air temperature setpoint. The controller causes the variable-speed compressor to operate at the determined compressor speed.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 6 of the drawings, like numerals being used for like and corresponding parts of the various drawings.

Figure 2:
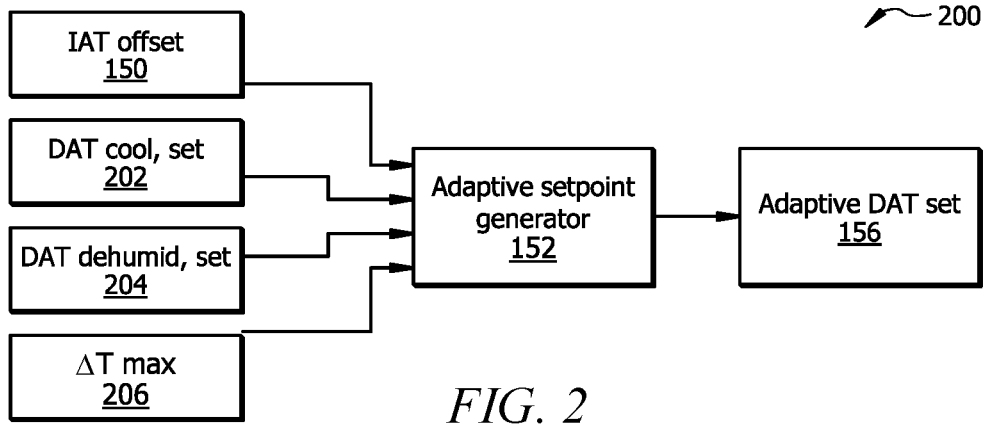
FIG. 2 is a flow diagram illustrating the determination of an adaptive discharge air temperature setpoint using the HVAC system illustrated in FIG. 1.
Figure 3:
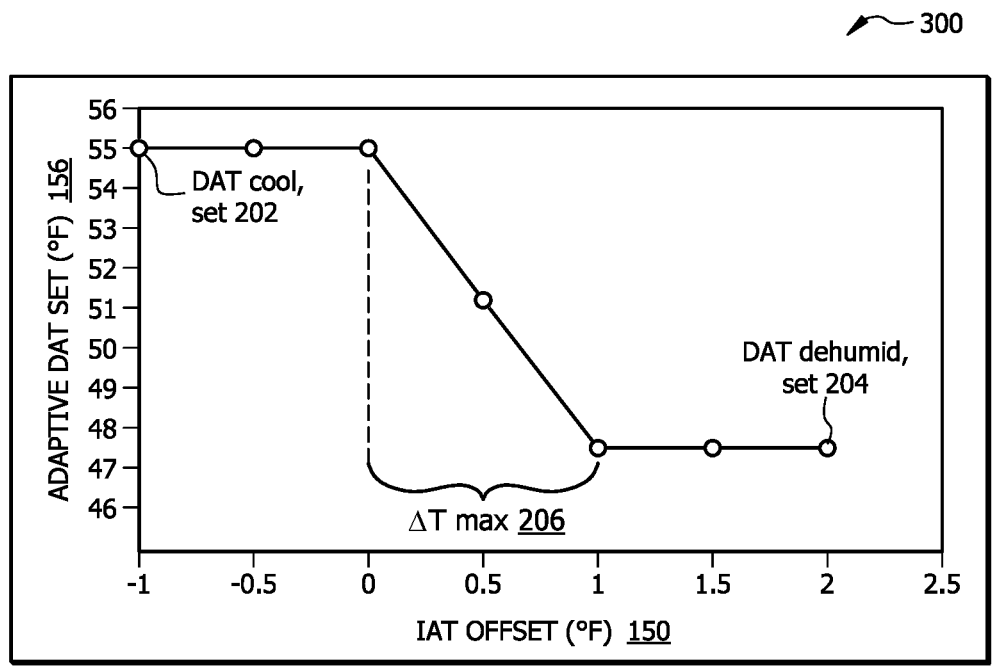
FIG. 3 is a plot illustrating an example adaptive discharge air temperature setpoint as a function of the difference or offset between indoor air temperature and the indoor temperature setpoint.
Figure 4B:
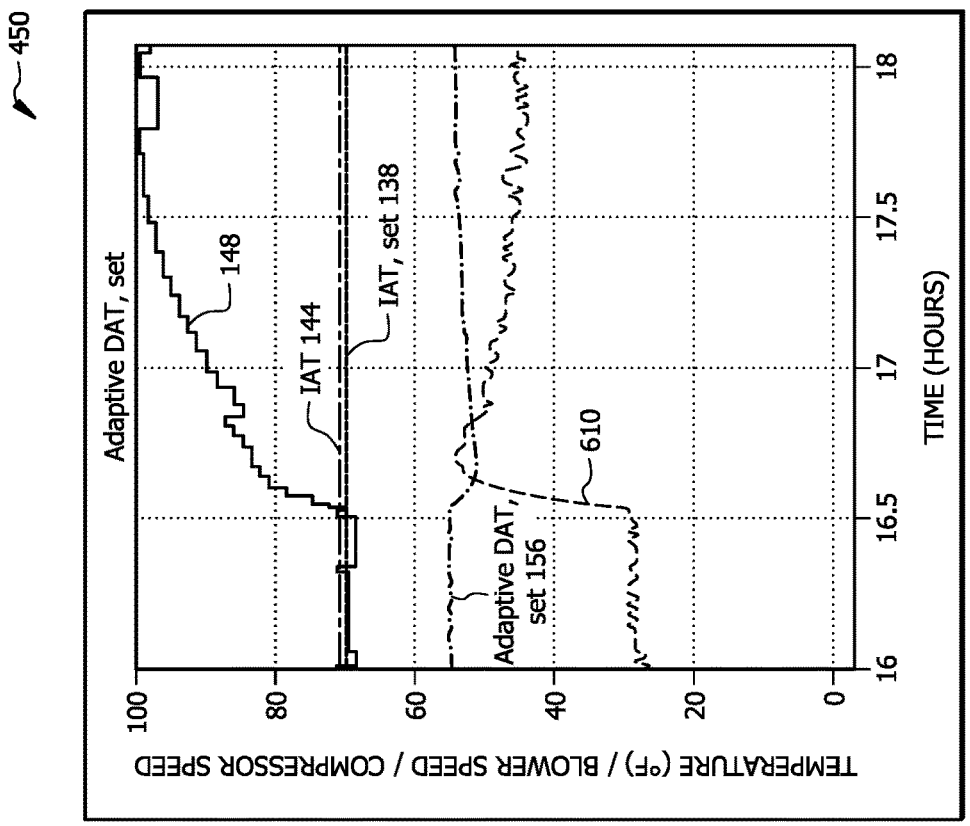
FIG. 4B is a plot illustrating example performance of the same HVAC system of FIG. 4A operated with an adaptive discharge air temperature setpoint.
Figure 4A:
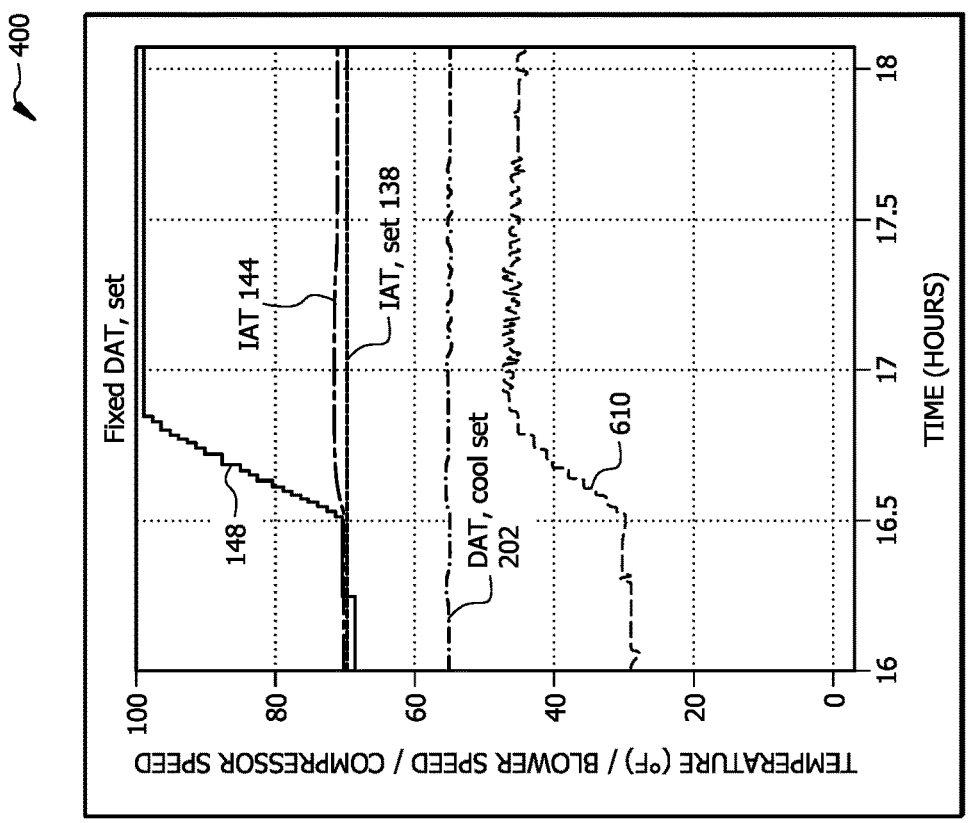
FIG. 4A is a plot illustrating example performance of an HVAC system operated without an adaptive discharge air temperature setpoint.
Figure 5:
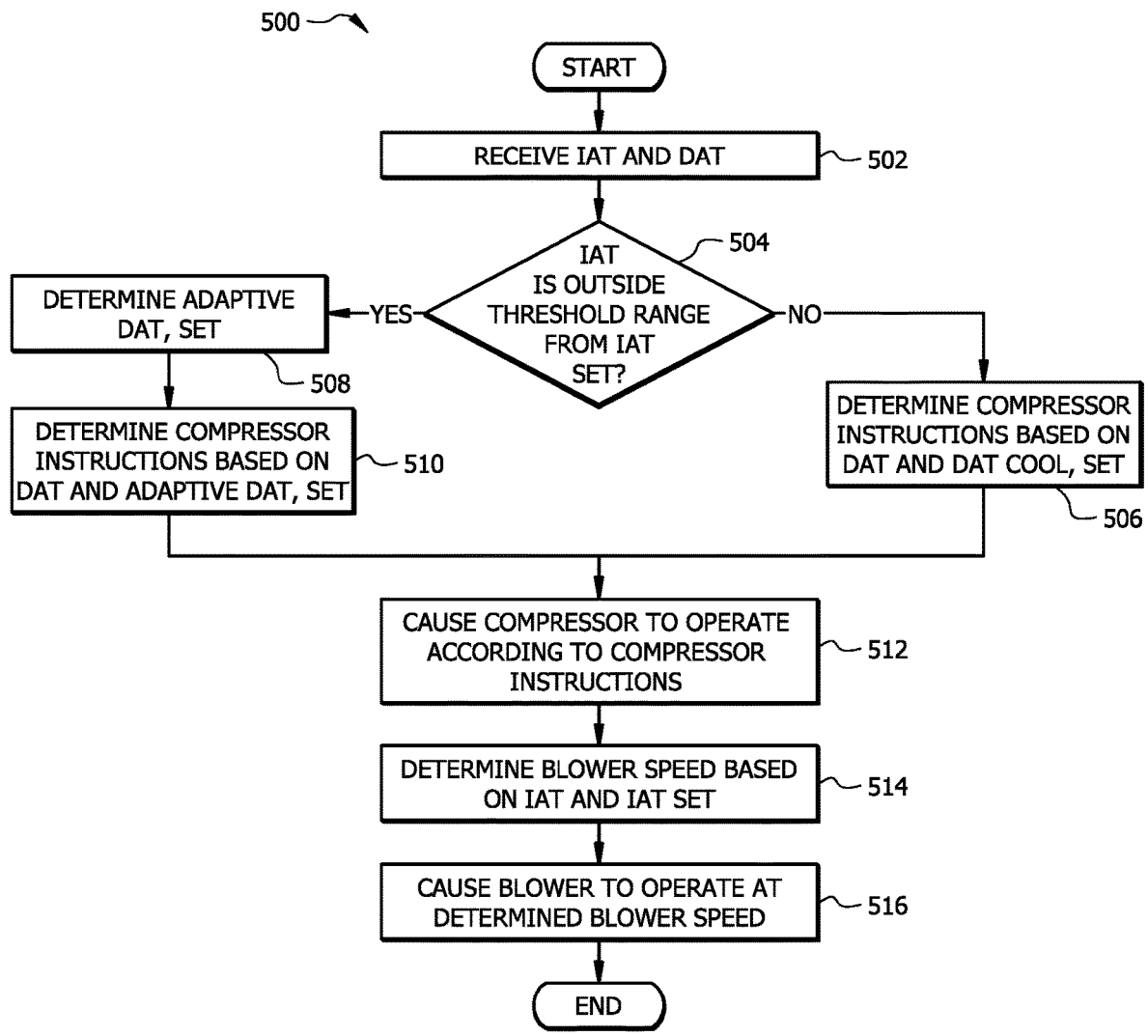
FIG. 5 is a flowchart illustrating an example method of operating the example HVAC system illustrated in FIG. 1 using an adaptive discharge air temperature setpoint.
Figure 6:
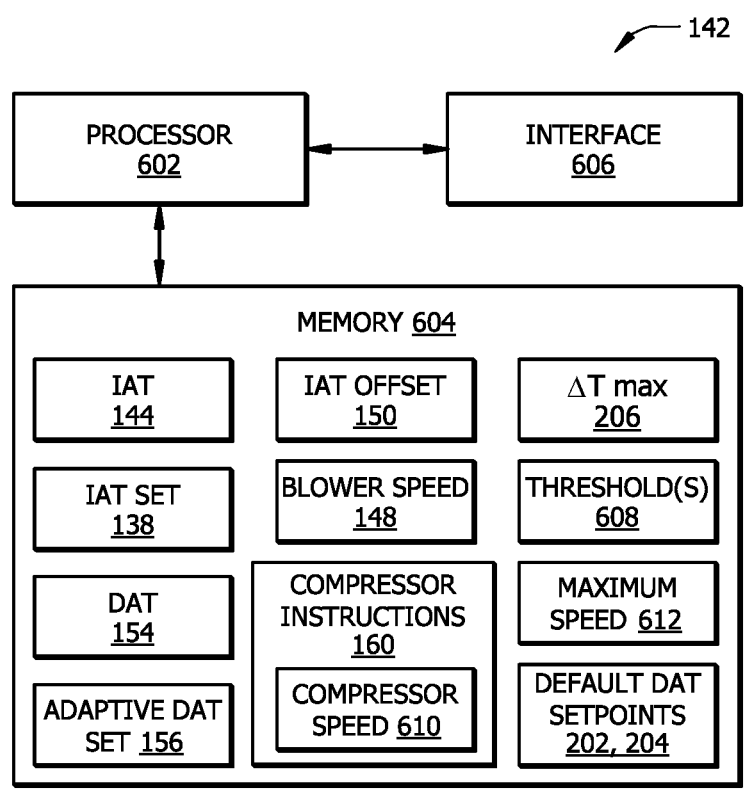
FIG. 6 is a diagram of the controller of the example HVAC system illustrated in FIG. 1.

As described above, prior to the present disclosure, a target indoor temperature may be reached only very slowly or may never be reached using previous technology. The HVAC system illustrated in FIG. 1 and described below overcomes this technical problem of previous technology by operating using an adaptive discharge air temperature setpoint. FIGS. 2 and 3 illustrate the determination of an adaptive discharge air temperature setpoint for operating of the HVAC system of FIG. 1. FIGS. 4A and 4B illustrate the improved performance of an example HVAC system configured according to the example of FIG. 1. The example HVAC system reaches a target indoor setpoint temperature more rapidly when operated using the adaptive discharge air temperature setpoint (FIG. 4B) than was possible using previous technology without an adaptive DAT setpoint (as in FIG. 4A). FIG. 5 illustrates an example method of operating the system of FIG. 1. FIG. 6 illustrates an example controller for the HVAC system of FIG. 1.

HVAC System

Figure 1:
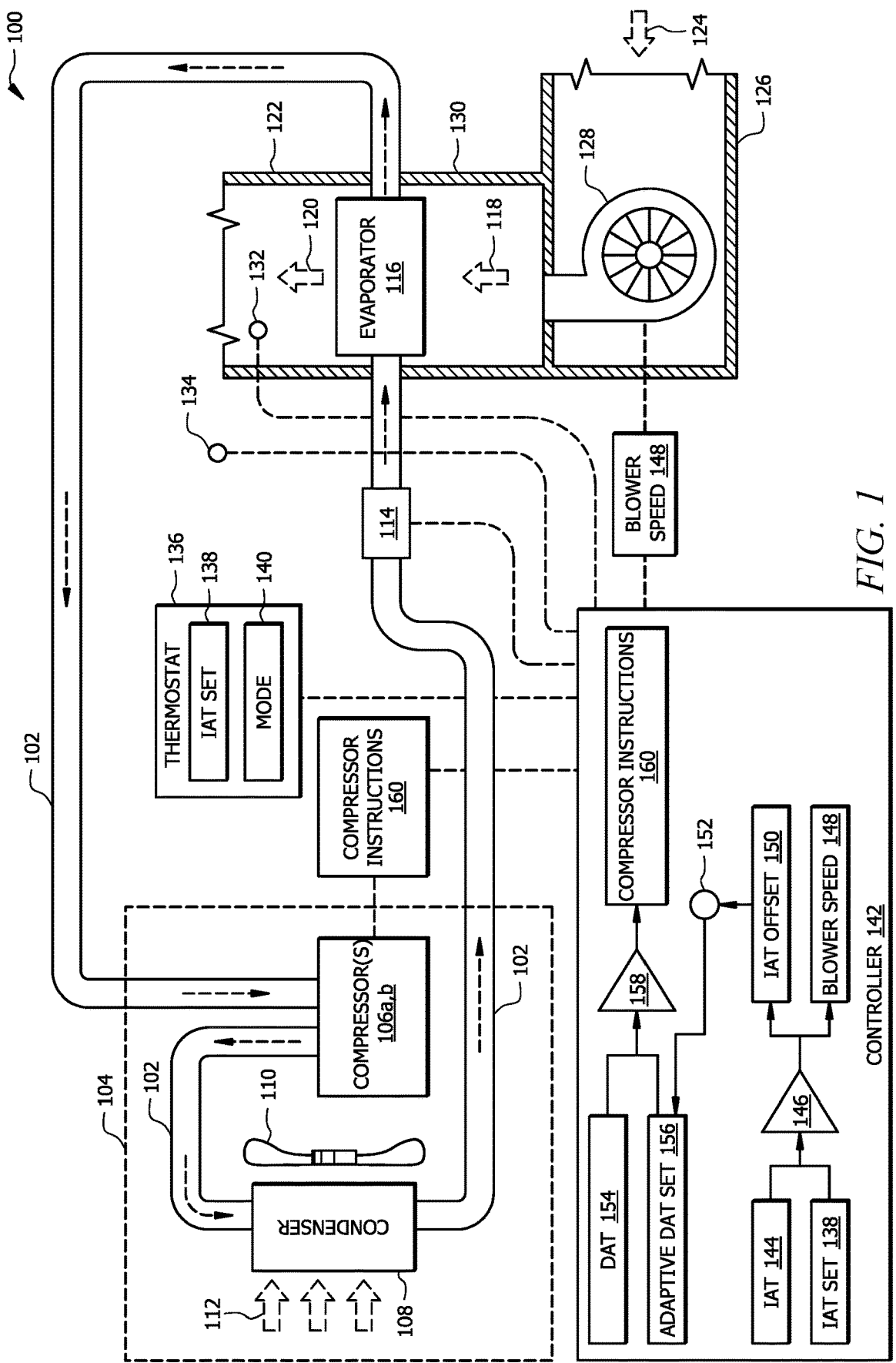
FIG. 1 is a diagram of an example HVAC system configured for control using an adaptive discharge air temperature setpoint.

FIG. 1 is a schematic diagram of an embodiment of an HVAC system 100 with a controller 142 configured to determine an adaptive discharge air temperature (DAT) setpoint 156 and operate the HVAC system 100 using the adaptive DAT setpoint 156. For example, the HVAC system 100 may use the adaptive DAT setpoint 156 to determine compressor instructions 160 for more effectively operating one or more compressors 106a,b of the HVAC system 100. Operation using the adaptive DAT setpoint 156 facilitates reaching an indoor air temperature (IAT) setpoint 138 more rapidly and more reliably than was possible using previous technology. The HVAC system 100 generally conditions air for delivery to a conditioned space. The conditioned space may be, for example, a room, a house, an office building, a warehouse, or the like. In some embodiments, the HVAC system 100 is a rooftop unit (RTU) that is positioned on the roof of a building and the conditioned air is delivered to the interior of the building. In other embodiments, portion(s) of the system 100 may be located within the building and portion(s) outside the building. The HVAC system 100 may include one or more heating elements, not shown for convenience and clarity. The HVAC system 100 may be configured as shown in FIG. 1 or in any other suitable configuration. For example, the HVAC system 100 may include additional components or may omit one or more components shown in FIG. 1.

The HVAC system 100 includes a working-fluid conduit subsystem 102, at least one condensing unit 104, an expansion device 114, an evaporator 116, a blower 128, a thermostat 136, and a controller 142. The working-fluid conduit subsystem 102 facilitates the movement of a working fluid (e.g., a refrigerant) through a cooling cycle such that the working fluid flows as illustrated by the dashed arrows in FIG. 1. The working fluid may be any acceptable working fluid including, but not limited to hydroflurocarbons (e.g., R-410A) or any other suitable type of refrigerant.

The condensing unit 104 includes one or more compressors 106a,b, a condenser 108, and a fan 110. In some embodiments, the condensing unit 104 is an outdoor unit while at least a portion of the other components of system 100 may be located indoors. The compressor(s) 106a,b is/are coupled to the working-fluid conduit subsystem 102 and compresses (i.e., increases the pressure of) the working fluid. The compressor(s) 106a,b of condensing unit 104 may be a single-stage compressor, a variable-speed compressor, or a multi-stage compressor. In some embodiments, the HVAC system 100 includes a first compressor 106a that is a variable-speed compressor. A variable-speed compressor is generally configured to operate at different speeds (e.g., based on compressor instructions 160 described below) to increase the pressure of the working fluid to keep the working fluid moving along the working-fluid conduit subsystem 102. The speed of the variable-speed compressor 106a can be modified (e.g., based on compressor instructions 160) to adjust the cooling capacity of the HVAC system 100. In some embodiments, the HVAC system 100 also includes a second compressor 106b that is any appropriate type of compressor (e.g., single-stage or variable-speed). For example, if the variable-speed compressor 106a cannot reach a target speed indicated by the compressor instructions 160, the controller 142 may cause the second compressor 106b to activate to provide further compression of the working fluid. In embodiments with two or more compressors 106a,b the compressors 106a,b may be in series or in parallel (e.g., in one or more additional condensing units 104, not shown for clarity and conciseness).

The compressor(s) 106a,b is/are in signal communication with the controller 142 using wired and/or wireless connection. The controller 142 provides compressor instructions 160, which include commands and/or signals to control operation of the compressor(s) 106a,b. The controller 142 may receive signals from the compressor(s) 106a,b, for example, corresponding to a status of the compressor(s) 106a,b. For example, when the compressor 106a is a variable-speed compressor, the controller 142 may provide compressor instructions 160 indicating a compressor speed (e.g., compressor speed 610 of FIG. 6) at which to operate the compressor 106a. If the compressors 106a,b operate as a multi-stage compressor, the compressor instructions 160 may include an indication of which compressors 106a,b to turn on and off, based on the adaptive DAT setpoint 156 (described further below). The controller 142 may operate the compressor(s) 106a,b in different modes corresponding to load conditions (e.g., the amount of cooling or heating requested from the HVAC system 100), whether a cooling or dehumidification mode of operation is requested, and the like. The controller 142 and its components are described in greater detail below and with respect to FIG. 6.

The condenser 108 is configured to facilitate movement of the working fluid through the working-fluid conduit subsystem 102. The condenser 108 is generally located downstream of the compressor(s) 106a,b and is configured to remove heat from the working fluid. The fan 110 is configured to move air 112 across the condenser 108. For example, the fan 110 may be configured to blow outside air through the condenser 108 to help cool the working fluid flowing therethrough. The fan 110 may be in communication with the controller 142 (e.g., via wired and/or wireless communication) to receive control signals for turning the fan 110 on and off and/or adjusting a speed of the fan 110. For example, the compressor instructions 160 may also include an indication of a speed at which the fan 110 should rotate. The compressed, cooled working fluid flows from the condenser 108 toward the expansion device 114.

The expansion device 114 is coupled to the working-fluid conduit subsystem 102 downstream of the condenser 108 and is configured to remove pressure from the working fluid. In this way, the working fluid is delivered to the evaporator 116 and receives heat from airflow 118 to produce a conditioned airflow 120 that is delivered by a duct subsystem 122 to the conditioned space. In general, the expansion device 114 may be a valve such as an expansion valve or a flow control valve (e.g., a thermostatic expansion valve (TXV)) or any other suitable valve for removing pressure from the working fluid while, optionally, providing control of the rate of flow of the working fluid. The expansion device 114 may be in communication with the controller 142 (e.g., via wired and/or wireless communication) to receive control signals for opening and/or closing associated valves and/or to provide flow measurement signals corresponding to the rate of working fluid flow through the working-fluid conduit subsystem 102.

The evaporator 116 is generally any heat exchanger configured to allow or facilitate heat transfer between air flowing through (or across) the evaporator 116 (i.e., air of airflow 118 contacting an outer surface of one or more coils of the evaporator 116) and working fluid passing through the interior of the evaporator 116. The evaporator 116 may include one or more circuits of coils. The evaporator 116 is fluidically connected to the compressor(s) 106a,b, such that working fluid generally flows from the evaporator 116 to the condensing unit 104.

A portion of the HVAC system 100 is configured to move airflow 118 provided by the blower 128 across the evaporator 116 and out of the duct sub-system 122 as conditioned airflow 120. Return air 124, which may be air returning from the building, fresh air from outside, or some combination, is pulled into a return duct 126. A suction side of the blower 128 pulls the return air 124. The blower 128 discharges airflow 118 into a duct 130 such that airflow 118 crosses the evaporator 116 or heating elements (not shown) to produce conditioned airflow 120. The blower 128 is any mechanism for providing airflow 118 through the HVAC system 100. For example, the blower 128 may be a variable-speed circulation blower or fan. Examples of a variable-speed blower include, but are not limited to, belt-drive blowers controlled by inverters, direct-drive blowers with electronic commuted motors (ECM), or any other suitable type of blower. The blower 128 is in signal communication with the controller 142 using wired and/or wireless connection. The controller 142 provides a blower speed 148 (described further below) at which to operate the blower 128 (e.g., a rate of rotation at which to operate the blower 128, an amount of power to supply to a motor of the blower 128, or the like).

The HVAC system 100 includes one or more sensors 132, 134 in signal communication with controller 142 (e.g., via wired and/or wireless connection). Sensors 132, 134 may include any suitable type of sensors for measuring air temperature, relative humidity, and/or any other properties of a conditioned space (e.g. a room or building). In the example of FIG. 1, sensor 132 is positioned and configured to measure a discharge air temperature (DAT) 154 of the airflow 120 provided from the evaporator 116 or to the conditioned space (e.g., in or near duct 122). Sensor 134 is positioned and configured to measure an indoor air temperature (IAT) 144 of air in the conditioned space. In some embodiments, the sensor 134 may embedded within or in communication with the thermostat 136. One or more additional sensors (not shown for clarity and conciseness) may be positioned anywhere within the conditioned space, the HVAC system 100, and/or the surrounding environment. As an example, the HVAC system 100 may include sensors positioned and configured to measure any other suitable type of air temperature (e.g., the temperature of air at one or more locations within the conditioned space and/or an outdoor air temperature) or other property (e.g., a relative humidity of air at one or more locations within the conditioned space or outdoors).

The HVAC system 100 includes one or more thermostats 136, for example, located within the conditioned space (e.g. a room or building). A thermostat 136 is generally in signal communication with the controller 142 using any suitable type of wired and/or wireless connection. Also or alternatively, one or more functions of the controller 142 may be performed by the thermostat 136. For example, the thermostat 136 may include the controller 142. The thermostat 136 may be a single-stage thermostat, a multi-stage thermostat, or any suitable type of thermostat. The thermostat 136 is configured to allow a user to input a desired temperature or indoor air temperature (IAT) setpoint 138 for the conditioned space and/or for a designated space or zone such as a room in the conditioned space. The controller 142 may use information from the thermostat 136 such as the temperature setpoint 138 for controlling the compressor(s) 106a,b and the blower 128, as described in greater detail below.

In some embodiments, the thermostat 136 may include a user interface and display for displaying information related to the operation and/or status of the HVAC system 100. For example, the user interface may display operational, diagnostic, and/or status messages and provide a visual interface that allows at least one of an installer, a user, a support entity, and a service provider to perform actions with respect to the HVAC system 100. For example, the user interface may provide for selection and/or display of an operating mode 140 of the HVAC system 100. The mode 140 may correspond to whether the HVAC system 100 is operating to provide cooling (in a cooling mode 140), is operating to provide dehumidification (in a dehumidification mode 140), is operating to provide heating (in a heating mode 140), is operating with an adaptive DAT setpoint 156 (e.g., in an adaptive discharge setpoint mode 140), or the like. The user interface may display other information such as the indoor air temperature 144, indoor air temperature setpoint 138, one or more alerts, and/or other messages related to the status and/or operation of the HVAC system 100 and/or its components.

As described in greater detail below with respect to FIGS. 2-6, the controller 142 is configured to store the indoor air temperature setpoint 138 (e.g., received from the thermostat 136) and a default discharge air temperature setpoint (e.g., one or both of setpoints 202, 204 of FIG. 2). The controller 142 may be implemented using the processor, memory, and input/output interface described with respect to FIG. 6 below. The controller 142 receives measurements of the indoor air temperature 144 (e.g., from sensor 134) and discharge air temperature 154 (e.g., from sensor 132). The controller 142 determines, using indoor temperature comparator 146, a difference or offset 150 between the indoor air temperature 144 and the indoor air temperature setpoint 138. The comparator 146 is configured to compare (e.g., by determining a difference, ratio, or any other appropriate value) the indoor air temperature 144 and the indoor air temperature setpoint 138. The controller 142 may determine a blower speed 148 at which to operate the blower 128 based on the measured indoor air temperature 144 and the indoor air temperature setpoint 138 (e.g., based on offset 150). The determined blower speed 148 may be provided to the blower 128 in order to cause the blower 128 to operate at the determined blower speed 148, as illustrated in FIG. 1.

If the offset 150 is not within a predefined temperature range (e.g., a threshold temperature range included in the thresholds 608 of FIG. 6), an adaptive DAT setpoint 156 is determined using the adaptive setpoint generator 152. In some embodiments, the adaptive DAT setpoint 156 is determined when the measured indoor air temperature 144 is greater than the indoor air temperature setpoint 138 (i.e., such that operation in a cooling mode 140 is appropriate) and the offset 150 is not within the predefined temperature range.

The adaptive DAT setpoint 156 is determined based on one or more default DAT setpoints (e.g., setpoints 202, 204 of FIG. 2) and the offset 150, as described with respect to the examples of FIGS. 2 and 3 below. The measured DAT 154 is compared to the adaptive DAT setpoint 156, using DAT comparator 158, to determine compressor instructions 160. The comparator 158 is configured to compare (e.g., by determining a difference, ratio, or any other appropriate value) the DAT 154 and the adaptive DAT setpoint 156. For instance, if the measured DAT 154 is a first threshold amount above the adaptive DAT setpoint 156, the compressor instructions 160 may cause the variable-speed compressor 106a to operate at a first speed to increase cooling provided by the HVAC system 100. If the measured DAT 154 is a second threshold amount (where the second threshold amount is larger than the first threshold amount) above the adaptive DAT setpoint 156, the compressor instructions 160 may cause the variable-speed compressor 106a to operate at a second speed that is faster than the first speed to further increase cooling provided by the HVAC system 100. In some embodiments, following causing the variable-speed compressor 106a to operate according to the compressor instructions 160, the indoor air temperature 144 reaches a value that is within a threshold value (e.g., a threshold 608 of FIG. 6) of the indoor air temperature setpoint 138 within a threshold time (see example results of FIGS. 4A and 4B). For example, the indoor air temperature 144 may be within 0.5° F. of the indoor air temperature setpoint 138 within about 15 minutes. As such, the indoor air temperature setpoint 138 may be reached more quickly using the HVAC system 100 with the adaptive DAT setpoint 156 than was possible using previous technology.

In some embodiments, the controller 142 may cause a second compressor 106b to activate (e.g., if the variable-speed compressor cannot complete the determined compressor instructions 160). For instance referring to the examples above, if the measured DAT 154 is a third threshold amount (where the third threshold amount is larger than the second threshold amount) above the adaptive DAT setpoint 156, the compressor instructions 160 may cause the second compressor 106b to activate to provide further cooling capacity to the HVAC system 100. As another example, if the controller 142 determines that a compressor speed indicated by the compressor instructions 160 (e.g., compressor speed 610 of FIG. 6) is greater than a maximum speed (e.g., the maximum speed 612 of FIG. 6) of the variable-speed compressor 106a, then the controller 142 may cause the variable-speed compressor 106a to operate at its maximum speed and the second compressor 106b to activate. The second compressor 106b provides supplemental cooling capacity to the HVAC system 100.

In certain embodiments, connections between various components of the HVAC system 100 are wired. For example, conventional cable and contacts may be used to couple the controller 142 to the various components of the HVAC system 100, including, the compressor 106, the expansion device 114, the blower 128, sensors 132, 134, and thermostat(s) 136. In some embodiments, a wireless connection is employed to provide at least some of the connections between components of the HVAC system 100. In some embodiments, a data bus couples various components of the HVAC system 100 together such that data is communicated there between. In a typical embodiment, the data bus may include, for example, any combination of hardware, software embedded in a computer readable medium, or encoded logic incorporated in hardware or otherwise stored (e.g., firmware) to couple components of HVAC system 100 to each other. As an example and not by way of limitation, the data bus may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus may include any number, type, or configuration of data buses, where appropriate. In certain embodiments, one or more data buses (which may each include an address bus and a data bus) may couple the controller 142 to other components of the HVAC system 100.

In an example operation of the HVAC system 100, the controller 142 determines that the indoor air temperature 144 is greater than the indoor air temperature setpoint 138 and starts up the HVAC system 100 to provide cooling to the space. The HVAC system 100 may initially operate in a cooling mode 140. The controller 142 instructs the blower 128 to operate at a blower speed 148. The blower speed 148 may be determined based on the indoor air temperature 144 and the indoor air temperature setpoint 138. For instance, a control loop (e.g., a PI control loop) may be implemented to adjust the blower speed 148 to minimize the offset 150 between the indoor air temperature 144 and IAT setpoint 138. Meanwhile, the controller 142 also adjusts the compressor instructions 160 to maintain the discharge air temperature 154 at or near a default predefined value (e.g., the default cooling mode discharge air temperature setpoint 202 of FIG. 2). For example, a control loop (e.g., a PI control loop) may be implemented to adjust the compressor instructions 160 (e.g., the compressor speed 610 of FIG. 6 for the variable-speed compressor 106a and optionally instructions to turn on the second compressor 106b) to maintain the DAT 154 at or near the default predefined value.

During operation of the HVAC system 100, as described above, the controller 142 detects that the indoor air temperature 144 is greater than the IAT setpoint 138 and that the indoor air temperature offset 150 is greater than a threshold value (e.g., a threshold of the thresholds 608 of FIG. 6). In response to this determination, the controller 142 uses the adaptive setpoint generator 152 to determine an adaptive DAT setpoint 156 with which to determine the compressor instructions 160 (e.g., using a control loop as described above). As described with respect to the examples of FIGS. 4A and 4B, operating the compressor(s) 106a,b using an adaptive DAT setpoint 156 allows the IAT setpoint 138 to be reached more rapidly and reliably than was previously possible. In some cases, operation of the compressor(s) 106a,b using the adaptive DAT setpoint 156 may allow the IAT setpoint 138 to be reached when the IAT setpoint 138 could not have been reached using previous technology.

FIG. 2 illustrates an example operation of the adaptive setpoint generator 152 of FIG. 1 to determine the adaptive DAT setpoint 156. The controller 142 may store (e.g., in memory 604 of FIG. 6) a default cooling mode discharge air temperature setpoint 202, a default dehumidification mode discharge air temperature setpoint 204, and a maximum temperature differential 206. The default cooling mode discharge air temperature setpoint 202 is the default predefined value that is used to determine the compressor instructions 160 under normal cooling mode 140 operation (e.g., when an adaptive DAT setpoint 156 is not needed). The default dehumidification mode discharge air temperature setpoint 204 is the default predefined value that is used to determine the compressor instructions 160 under normal dehumidification mode 140 operation (e.g., when an adaptive DAT setpoint 156 is not needed). The maximum temperature differential 206 is the temperature range of the indoor air temperature offset 150 over which an adaptive DAT setpoint 156 is determined.

As illustrated in the example of FIG. 2, the adaptive DAT setpoint 156 may be determined using the indoor air temperature offset 150, the default discharge air temperature setpoints 202, 204, and/or the maximum temperature differential 206. FIG. 3 shows an example plot 300 of the adaptive DAT setpoint 156 as a function of the indoor air temperature offset 150. The example adaptive DAT setpoint 156 shown in plot 300 has a value equal to the default cooling mode discharge air temperature setpoint 202 until the indoor air temperature offset 150 reaches a threshold value above which the adaptive DAT setpoint 156 is determined. In this example, the threshold value (e.g., the threshold of thresholds 608 of FIG. 6) is 0° F. The adaptive DAT setpoint 156 decreases over the maximum temperature differential 206 until it reaches the default dehumidification mode discharge air temperature setpoint 204. In the example of FIG. 3, the adaptive DAT setpoint 156 decreases linearly over the maximum temperature differential 206. In the example of FIG. 3, the threshold value for the indoor air temperature offset 150 above which an adaptive DAT setpoint 156 is determined is 0° F. However, this threshold value may be any appropriate value. For instance, if a threshold value of 1° F. is used, the adaptive DAT setpoint 156 illustrated in FIG. 3 would remain at the default cooling mode discharge air temperature setpoint 202 value until an indoor air temperature offset 150 of 1° F. is reached. The adaptive DAT setpoint 156 then decreases in value over the maximum temperature differential 206 until the default dehumidification mode discharge air temperature setpoint 204 is reached. Moreover, while the example maximum temperature differential 206 is 1° F. in the example of FIG. 3, the maximum temperature differential 206 may be any appropriate value (e.g., from about 0.5° F. to 5° F.).

Returning to the example operation of the HVAC system 100 of FIG. 1, the controller 142 uses the adaptive DAT setpoint 156 (e.g., determined as described with respect to FIGS. 2 and 3 above) to determine the compressor instructions 160. For example, the DAT 154 measured by sensor 132 may be compared to the adaptive DAT setpoint 156, using the DAT comparator 158, to determine compressor instructions 160. The difference between the measured DAT 154 and the adaptive DAT setpoint 156 may be used to determine the compressor instructions 160, such that the compressor speed (e.g., compressor speed 610 of FIG. 6) indicated by the compressor instructions 160 increases when this difference increases. If the controller 142 determines that a compressor speed indicated by the compressor instructions 160 (e.g., a compressor speed 610 of FIG. 6) is greater than a maximum speed (e.g., the maximum speed 612 of FIG. 6) of the variable-speed compressor 106a, then the controller 142 may cause the variable-speed compressor 106a to operate at its maximum speed and cause the second compressor 106b to activate to provide supplemental compression.

Example Performance of Systems Configured According to HVAC System 100

As described above with respect to FIGS. 1-3, operating the compressor(s) 106a,b using compressor instructions 160 that are determined based on the specially selected adaptive DAT setpoint 156 of this disclosure allows the indoor air temperature 144 to be reached more rapidly and reliably than was possible using previous technology. The results illustrated in FIGS. 4A and 4B demonstrate benefits and improvements provided by operating an HVAC system using an adaptive DAT setpoint 156. FIG. 4A shows a plot 400 of the indoor air temperature 144 as a function of time for an example HVAC system operating using the default cooling mode discharge air temperature setpoint 202 without using an adaptive DAT setpoint 156, and FIG. 4B shows a plot 450 of the indoor air temperature 144 as a function of time for the same example HVAC system operating using the adaptive DAT setpoint 156. Plots 400, 450 also show the indoor air temperature setpoint 138, blower speed 148, and compressor speed 610 indicated by the compressor instructions 160 as a function of time.

In both plots 400, 450, a change in load occurs at time 16.5 hours, such that the indoor air temperature 144 increases above the indoor air temperature setpoint 138. With the system operating based on the adaptive DAT setpoint 156, as shown in plot 450 of FIG. 4B, the indoor air temperature 144 is brought to within less than 0.5° F. of the indoor air temperature setpoint 138 within 15 minutes. In contrast, with the system operating without the adaptive DAT setpoint 156, as shown in plot 400 of FIG. 4A, the indoor air temperature 144 remaining greater than 1° F. above the indoor air temperature setpoint 138 even after more than one hour. Plots 400 and 450 demonstrate the improvements achieved by operating an HVAC system based on adaptive DAT setpoint 156.

Example Method of Operation

FIG. 5 is a flowchart illustrating an example method 500 of operating the HVAC system 100 using an adaptive DAT setpoint 156. As described above with respect to FIGS. 1-4B, the use of an adaptive DAT setpoint 156 may allow the indoor air temperature 144 to be maintained at or near an indoor air temperature setpoint 138 more rapidly and reliably than was possible using previous technology. The method 500 may begin at step 502 where the controller 142 of the HVAC system 100 receives measurements of the indoor air temperature 144 from sensor 134 and the discharge air temperature 154 from sensor 132.

At step 504, the controller 142 determines whether the indoor air temperature 144 is outside a threshold range (e.g., a threshold range of thresholds 608 of FIG. 6) of the indoor air temperature setpoint 138. For example, the controller 142 may determine the offset 150 described with respect to FIG. 1 and determine whether the offset 150 is greater than a threshold value (e.g., a threshold of thresholds 608 of FIG. 6). If the indoor air temperature 144 is not outside the threshold range of the indoor air temperature setpoint 138, the controller 142 proceeds to step 506 and determines the compressor instructions 106 (e.g., including the compressor speed 610 of FIG. 6 at which to operate the variable-speed compressor 106a of FIG. 1) using the default cooling mode discharge air temperature setpoint 202. In other words, if the indoor air temperature 144 is not outside the threshold range of the indoor air temperature setpoint 138, then an adaptive DAT setpoint 156 may not be determined (or the determined adaptive DAT setpoint 154 may be equal to the default cooling setpoint 202—see FIG. 3). In some cases, the controller 142 may determine the compressor instructions 160 to maintain the discharge air temperature 154 at or near the default cooling mode discharge air temperature setpoint 202. For example, a control loop (e.g., a PI control loop) may be implemented to adjust the compressor instructions 160 (e.g., the compressor speed 610 of FIG. 6 for a variable-speed compressor 106a and optionally instructions to turn on a second compressor 106b) to maintain the DAT 154 at or near the default cooling mode discharge air temperature setpoint 202. The compressor instructions 160 are then used to operate the HVAC system 100 at steps 512-516.

If, at step 504, the indoor air temperature 144 is outside the threshold range of the indoor air temperature setpoint 138, the controller 142 proceeds to step 508. At step 508, the controller 142 determines the adaptive DAT setpoint 156. The adaptive DAT setpoint 156 may be determined as described above with respect to FIGS. 1-3. For example, the adaptative DAT setpoint 156 may be determined based on the default discharge air temperature setpoints 202, 204 and the difference or offset 150 between the indoor air temperature 144 and the indoor air temperature setpoint 138.

At step 510, the controller 142 determines the compressor instructions 106 (e.g., the compressor speed 610 of FIG. 6 at which to operate the variable-speed compressor 106a of FIG. 1) using the adaptive DAT setpoint 156. For example, a difference between the measured DAT 154 and the adaptive DAT setpoint 156 from step 508 may be used to determine the compressor instructions 160. As an example, the determined compressor instructions 160 may indicate a compressor speed (e.g., compressor speed 610 of FIG. 6) that increases when this difference increases. In some cases, the controller 142 may determine the compressor instructions 160 to maintain the discharge air temperature 154 at or near the adaptive DAT setpoint 156 from step 508. For example, a control loop (e.g., a PI control loop) may be implemented to adjust the compressor instructions 160 (e.g., the compressor speed 610 of FIG. 6 for a variable-speed compressor 106a and optionally instructions to turn on a second compressor 106b) to maintain the DAT 154 at or near the adaptive DAT setpoint 156. If the controller 142 determines that a compressor speed indicated by the compressor instructions 160 (e.g., a compressor speed 610 of FIG. 6) is greater than a maximum speed (e.g., the maximum speed 612 of FIG. 6) of the variable-speed compressor 106a, then the controller 142 may determine compressor instructions 160 that cause the variable-speed compressor 106a to operate at its maximum speed and cause the second compressor 106b to activate.

At step 512, the compressor instructions 160 from either step 506 or 510 are used to operate the compressor(s) 106a,b. For example the controller 142 may provide the compressor instructions 160 to the compressor(s) 106a,b to cause the compressor(s) 106a,b to operate as determined at step 506 or 510. At step 514, the controller 142 determines a blower speed 148 at which to operate the blower 128 based on the received indoor air temperature 144 and the indoor air temperature setpoint 138. For example, the blower speed 148 may be determined based on the indoor air temperature 144 and the indoor air temperature setpoint 138. For instance, a control loop (e.g., a PI control loop) may be implemented to determine the blower speed 148 to minimize the offset 150 between the indoor air temperature 144 and IAT setpoint 138. At step 516, the controller 142 causes the blower 128 to operate at the determined blower speed 148. For example, the controller 142 may provide the blower speed 148 determined at step 514 to the blower 128, such that the blower 128 operates at the speed 148.

Modifications, additions, or omissions may be made to method 500 depicted in FIG. 5. Method 500 may include more, fewer, or other steps. For example, steps may be performed in parallel or in any suitable order. While at times discussed as controller 142, HVAC system 100, or components thereof performing the steps, any suitable HVAC system or components thereof may perform one or more steps of the method 500.

Example Controller

FIG. 6 is a schematic diagram of an embodiment of the controller 142. The controller 142 includes a processor 602, a memory 604, and an input/output (I/O) interface 606.

The processor 602 includes one or more processors operably coupled to the memory 604. The processor 602 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs) that communicatively couples to memory 604 and controls the operation of HVAC system 100. The processor 602 may be a programmable logic device, a microcontroller, a microprocessor, or any suitable combination of the preceding. The processor 602 is communicatively coupled to and in signal communication with the memory 604. The one or more processors are configured to process data and may be implemented in hardware or software. For example, the processor 602 may be 8-bit, 16-bit, 32-bit, 64-bit or of any other suitable architecture. The processor 602 may include an arithmetic logic unit (ALU) for performing arithmetic and logic operations, processor registers that supply operands to the ALU and store the results of ALU operations, and a control unit that fetches instructions from memory 604 and executes them by directing the coordinated operations of the ALU, registers, and other components. The processor 602 may include other hardware and software that operates to process information, control the HVAC system 100, and perform any of the functions described herein (e.g., with respect to FIG. 6). The processor 602 is not limited to a single processing device and may encompass multiple processing devices. Similarly, the controller 142 is not limited to a single controller but may encompass multiple controllers.

The memory 604 includes one or more disks, tape drives, or solid-state drives, and may be used as an over-flow data storage device, to store programs when such programs are selected for execution, and to store instructions and data that are read during program execution. The memory 604 may be volatile or non-volatile and may include ROM, RAM, ternary content-addressable memory (TCAM), dynamic random-access memory (DRAM), and static random-access memory (SRAM). The memory 604 is operable to store measured indoor air temperatures 144 and discharge air temperatures 154, indoor air temperature setpoints 138, adaptive DAT setpoints 156, IAT offsets 150, blower speeds 148, compressor instructions, default DAT setpoints 202, 204, maximum temperature differentials 206, thresholds 608 (e.g., any of the threshold values described in this disclosure), the maximum speed 612 of the variable-speed compressor 106a, and/or any other logic and/or instructions for performing the function described in this disclosure. As described above, the compressor instructions 160 include a compressor speed 610 at which to operate the variable-speed compressor 106a along with instructions for whether or not to operate a second compressor 106b.

The I/O interface 606 is configured to communicate data and signals with other devices. For example, the I/O interface 606 may be configured to communicate electrical signals with components of the HVAC system 100 including the compressor 106, expansion device 114, blower 128, sensors 140a,b, motor drive 134, and thermostat 136. The I/O interface may provide and/or receive, for example, compressor speed signals, blower speed signals, temperature signals, relative humidity signals, thermostat calls, temperature setpoints, environmental conditions, and an operating mode status for the HVAC system 100 and send electrical signals to the components of the HVAC system 100. The I/O interface 606 may include ports or terminals for establishing signal communications between the controller 142 and other devices. The I/O interface 606 may be configured to enable wired and/or wireless communications.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A heating, ventilation and air conditioning (HVAC) system, comprising:
a blower configured to provide a flow of air across an evaporator of the HVAC system;
a variable-speed compressor configured to compress a refrigerant flowing through the HVAC system;
an indoor air temperature sensor positioned and configured to measure an indoor air temperature (IAT) of the enclosed space;
a discharge air temperature sensor positioned and configured to measure a discharge air temperature (DAT) of the flow of air downstream of the evaporator; and
a controller communicatively coupled to the blower, variable-speed compressor, the indoor air temperature sensor, and the discharge air temperature sensor, the controller comprising:
a memory configured to store an indoor temperature setpoint and a default discharge air temperature setpoint; and
a processor configured to:
receive the IAT;
receive the DAT;
determine, based on a difference between the received IAT and the indoor temperature setpoint, that the IAT is not within a threshold range of the indoor temperature setpoint;
after determining that the IAT is not within the threshold range of the indoor temperature setpoint, determine an adaptive discharge air temperature setpoint based on the default discharge air temperature setpoint and the difference between the received IAT and the indoor temperature setpoint;
determine a compressor speed at which to operate the variable-speed compressor based on the adaptive discharge air temperature setpoint; and
cause the variable-speed compressor to operate at the determined compressor speed.

2. The system of claim 1, wherein the processor is further configured to determine that the IAT is not within the threshold range of the indoor temperature setpoint when the IAT is greater than the indoor temperature setpoint.

3. The system of claim 1, wherein:
the memory is further configured to store a default dehumidification mode discharge air temperature setpoint and a maximum temperature differential; and
the processor is further configured to determine the adaptive discharge air temperature setpoint based on the default discharge air temperature setpoint, the difference between the received IAT and the indoor temperature setpoint, the default dehumidification mode discharge air temperature setpoint, and the maximum temperature differential.

4. The system of claim 1, wherein the processor is further configured to determine the compressor speed based on a difference between the received DAT and the adaptive discharge air temperature setpoint.

5. The system of claim 1, wherein:
the HVAC system further comprises a second compressor; and
the processor is further configured to:
determine that the determined compressor speed is greater than a maximum speed of the variable-speed compressor;
after determining that the determined compressor speed is greater than the maximum speed of the variable-speed compressor:
cause the variable-speed compressor to operate at the maximum speed; and
cause the second compressor to activate.

6. The system of claim 1, wherein following causing the variable-speed compressor to operate at the determined compressor speed, the IAT is within a threshold value of the indoor temperature setpoint within a threshold time.

7. The system of claim 1, wherein the processor is further configured to:
determine a blower speed at which to operate the blower based on the received IAT and the indoor temperature setpoint; and
cause the blower to operate at the determined blower speed.

8. A method comprising, by a controller of a heating, ventilation and air conditioning (HVAC) system:
receiving an indoor air temperature (IAT) of an enclosed space to which conditioned air is provided by the HVAC system;
receiving a discharge air temperature (DAT) of a flow of air downstream of an evaporator of the HVAC system;
determining, based on a difference between the received IAT and the indoor temperature setpoint, that the IAT is not within a threshold range of an indoor temperature setpoint;
after determining that the IAT is not within the threshold range of the indoor temperature setpoint, determining an adaptive discharge air temperature setpoint based on a default discharge air temperature setpoint and the difference between the received IAT and the indoor temperature setpoint;

determining a compressor speed at which to operate a variable-speed compressor of the HVAC system based on the adaptive discharge air temperature setpoint; and causing the variable-speed compressor to operate at the determined compressor speed.

9. The method of claim 8, further comprising determining that the IAT is not within the threshold range of the indoor temperature setpoint when the IAT is greater than the indoor temperature setpoint.

10. The method of claim 8, further comprising determining that the adaptive discharge air temperature setpoint based on the default discharge air temperature setpoint, the difference between the received IAT and the indoor temperature setpoint, a default dehumidification mode discharge air temperature setpoint, and a maximum temperature differential.

11. The method of claim 8, further comprising determining the compressor speed based on a difference between the received DAT and the adaptive discharge air temperature setpoint.

12. The method of claim 8, further comprising:
determining that the determined compressor speed is greater than a maximum speed of the variable-speed compressor;
after determining that the determined compressor speed is greater than the maximum speed of the variable-speed compressor:
causing the variable-speed compressor to operate at the maximum speed; and
causing a second compressor of the HVAC system to activate.

13. The method of claim 8, wherein following causing the variable-speed compressor to operate at the determined compressor speed, the IAT is within a threshold value of the indoor temperature setpoint within a threshold time.

14. The method of claim 8, further comprising:
determining a blower speed at which to operate a blower of the HVAC system based on the received IAT and the indoor temperature setpoint; and
causing the blower to operate at the determined blower speed.

15. A controller for operating a heating, ventilation, and air conditioning (HVAC) system, the controller comprising:
a memory configured to store an indoor temperature setpoint and a default discharge air temperature setpoint; and
a processor configured to:
receive an indoor air temperature (IAT) of an enclosed space to which conditioned air is provided by the HVAC system;
receive a discharge air temperature (DAT) of a flow of air measured downstream of an evaporator of the HVAC system;
determine, based on a difference between the received IAT and the indoor temperature setpoint, that the IAT is not within a threshold range of the indoor temperature setpoint;
after determining that the IAT is not within the threshold range of the indoor temperature setpoint, determine an adaptive discharge air temperature setpoint based on the default discharge air temperature setpoint and the difference between the received IAT and the indoor temperature setpoint;
determine a compressor speed at which to operate a variable-speed compressor of the HVAC system based on the adaptive discharge air temperature setpoint; and
cause the variable-speed compressor to operate at the determined compressor speed.

16. The controller of claim 15, wherein the processor is further configured to determine that the IAT is not within the threshold range of the indoor temperature setpoint when the IAT is greater than the indoor temperature setpoint.

17. The controller of claim 15, wherein:
the memory is further configured to store a default dehumidification mode discharge air temperature setpoint and a maximum temperature differential; and
the processor is further configured to determine the adaptive discharge air temperature setpoint based on the default discharge air temperature setpoint, the difference between the received IAT and the indoor temperature setpoint, the default dehumidification mode discharge air temperature setpoint, and the maximum temperature differential.

18. The controller of claim 15, wherein the processor is further configured to determine the compressor speed based on a difference between the received DAT and the adaptive discharge air temperature setpoint.

19. The controller of claim 15, wherein the processor is further configured to:
determine that the determined compressor speed is greater than a maximum speed of the variable-speed compressor;
after determining that the determined compressor speed is greater than the maximum speed of the variable-speed compressor:
cause the variable-speed compressor to operate at the maximum speed; and
cause a second compressor of the HVAC system to activate.

20. The controller of claim 15, wherein the processor is further configured to:
determine a blower speed at which to operate a blower of the HVAC system based on the received IAT and the indoor temperature setpoint; and
cause the blower to operate at the determined blower speed.

\* \* \* \* \*